United States Patent
Inada

(10) Patent No.: US 8,649,340 B2
(45) Date of Patent: Feb. 11, 2014

(54) WIRELESS LAN SYSTEM, DEVICE, AND METHOD, AND MEDIUM HAVING WIRELESS LAN PROGRAM STORED THEREIN

(75) Inventor: Tetsuya Inada, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 285 days.

(21) Appl. No.: 13/032,651

(22) Filed: Feb. 23, 2011

(65) Prior Publication Data

US 2011/0205990 A1 Aug. 25, 2011

(30) Foreign Application Priority Data

Feb. 24, 2010 (JP) ................................. 2010-038753

(51) Int. Cl.
*H04W 28/04* (2009.01)
(52) U.S. Cl.
USPC ............ 370/329; 370/254; 370/255; 370/338
(58) Field of Classification Search
None
See application file for complete search history.

(56) References Cited

U.S. PATENT DOCUMENTS

| 6,580,700 | B1 * | 6/2003 | Pinard et al. | 370/332 |
| 2005/0288015 | A1 * | 12/2005 | Azizi et al. | 455/434 |
| 2008/0117879 | A1 * | 5/2008 | Wu et al. | 370/332 |
| 2010/0027519 | A1 * | 2/2010 | Chen | 370/338 |

FOREIGN PATENT DOCUMENTS

JP 2004-248289 A 9/2004

OTHER PUBLICATIONS

Speicher et al, Fast MAC-Layer Scanning in IEEE 802.11 Fixed Relay Radio Access Networks. 2006. IEEE. All Pages.*

* cited by examiner

*Primary Examiner* — Joseph Avellino
*Assistant Examiner* — Tsung Wu
(74) *Attorney, Agent, or Firm* — Oblon, Spivak, McClelland, Maier & Neustadt, L.L.P.

(57) ABSTRACT

A wireless LAN system, device, and method, and a medium having a wireless LAN program is provided. Wireless LAN devices are able to wirelessly communicate with each other by using a plurality of channels. A wireless LAN device is provided, including a requesting section and a post-request restoring section. The requesting section transmits a probe request by using a second channel selected from among a plurality of channels that the wireless LAN device can use, the probe request being assigned channel information indicating a first channel that the wireless LAN device currently uses. The post-request restoring section, when the second channel is not identical to the first channel, restores the channel used by the wireless LAN device from the second channel to the first channel within a first predetermined period from start of use of the second channel, after the transmission of the probe request.

6 Claims, 6 Drawing Sheets

F I G. 6
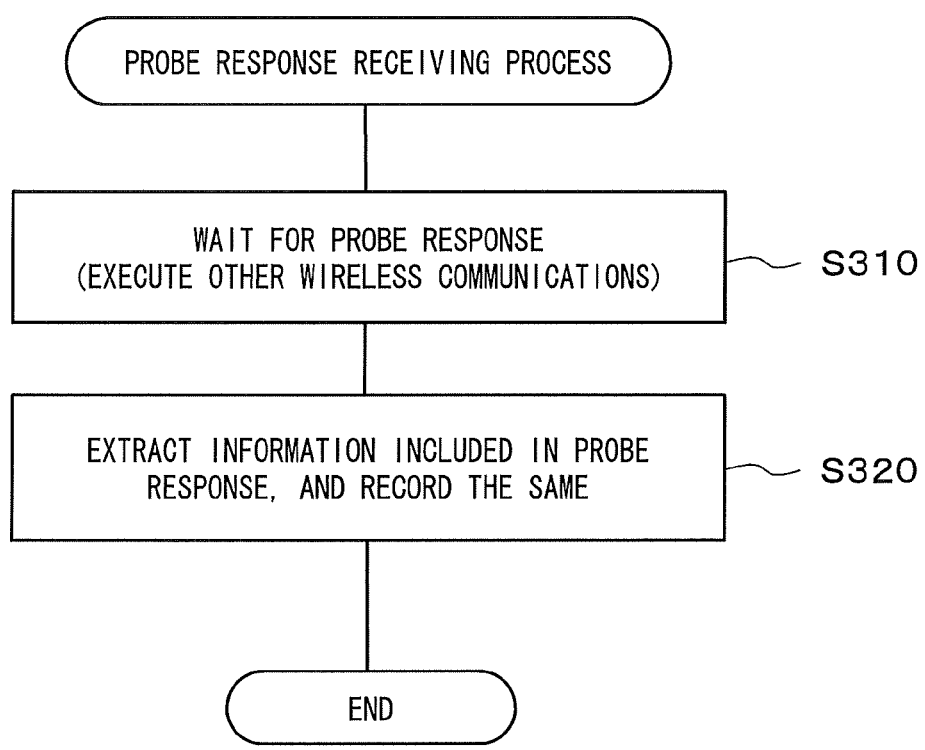

WIRELESS LAN SYSTEM, DEVICE, AND METHOD, AND MEDIUM HAVING WIRELESS LAN PROGRAM STORED THEREIN

CROSS REFERENCE TO RELATED APPLICATION

The disclosure of Japanese Patent Application No. 2010-038753, filed on Feb. 24 2010, is incorporated herein by reference.

BACKGROUND OF THE INVENTION

1. Field of the Invention

The present invention relates to a wireless LAN device capable of performing wireless communication using a plurality of channels.

2. Description of the Background Art

Wireless LAN has been widespread in recent years. In a wireless LAN, wireless LAN devices perform communication with each other within the coverage area of the wireless LAN devices. When it is desired to perform communication over a wide area exceeding the coverage area of a wireless LAN device, a plurality of wireless LAN devices are installed to wirelessly relay a packet via these wireless LAN devices, as disclosed in Japanese Laid-Open Patent Publication No. 2004-248289, for example.

In order to realize such wireless relay of a packet among the plurality of wireless LAN devices, a wireless LAN device needs to detect another wireless LAN device. One method to detect another wireless LAN device is as follows. One wireless LAN device acts as a station (non-access point station) that is communicably connectable to another wireless LAN device acting as an access point, and the wireless LAN device transmits a probe request to the other wireless LAN device. The other wireless LAN device (access point) receives the probe request, and transmits a probe response. Then, the wireless LAN device (station) receives the probe response to detect the other wireless LAN device (access point). In this method, however, if these wireless LAN devices are allowed to use a plurality of channels, the wireless LAN device that performs detection does not know which channel the other wireless LAN device currently uses and, therefore, has to frequently change the channel to transmit the probe request. If the wireless LAN device that performs detection acts as an access point and communicates with a station, it is difficult to maintain the communication with the station.

SUMMARY OF THE INVENTION

An object of the present invention is to provide a wireless LAN device capable of detecting another wireless LAN device that uses a channel different from a channel used by the wireless LAN device, while maintaining connection to a station connected to the wireless LAN device.

An aspect of the present invention is directed to a wireless LAN system including a first wireless LAN device and a second wireless LAN device which are able to wirelessly communicate with each other by using a plurality of channels. The first wireless LAN device includes a first nontransitory information recording medium having stored therein a program containing a requesting section and a post-request restoring section, each executed by a computer. The requesting section, when executed by the computer, transmits a probe request by using a second channel which is selected from among a plurality of channels that the first wireless LAN device can use, the probe request being assigned channel information indicating a first channel that the first wireless LAN device currently uses. The post-request restoring section, when executed by the computer, when the second channel is not identical to the first channel, restores the channel used by the first wireless LAN device from the second channel to the first channel within a first predetermined period from start of use of the second channel, after the transmission of the probe request. The second wireless LAN device includes a second nontransitory information recording medium having stored therein a program containing a responding section and a post-response restoring section, each executed by a computer. The responding section, when executed by the computer, is configured to receive the probe request by using the second channel, specify the first channel based on the channel information assigned to the probe request, and transmit a probe response to the first wireless LAN device by using the first channel. The post-response restoring section, when executed by the computer, when the second channel is not identical to the first channel, restores the channel used by the second wireless LAN device from the first channel to the second channel within a second predetermined period from start of use of the first channel, after the transmission of the probe response.

Preferably, each of the first and second predetermined periods is equal to or shorter than a beacon transmission period during which the first wireless LAN device transmits a beacon.

Preferably, the requesting section successively selects, a second channel, at intervals of a third predetermined period, each time the requesting section transmits a probe request, until all the channels that the first wireless LAN device can use have been selected.

Another aspect of the present invention is directed to the first and second wireless LAN devices included in the above-described wireless LAN system. Still another aspect of the present invention is directed to a method executed by processors of the first and second wireless LAN devices, and to a nontransitory computer-readable information recording medium encoded with a program of the method.

According the present invention, it is possible to provide a wireless LAN device capable of detecting another wireless LAN device which uses a channel different from a channel used by the wireless LAN device, while maintaining connection to stations.

The present invention is applicable to, for example, a wireless LAN device performing wireless communication in a wireless LAN. These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a flowchart illustrating a probe response receiving process.

DESCRIPTION OF THE PREFERRED EMBODIMENTS

Hereinafter, preferred embodiments of the present invention will be described.

Embodiment 1

Figure 1:
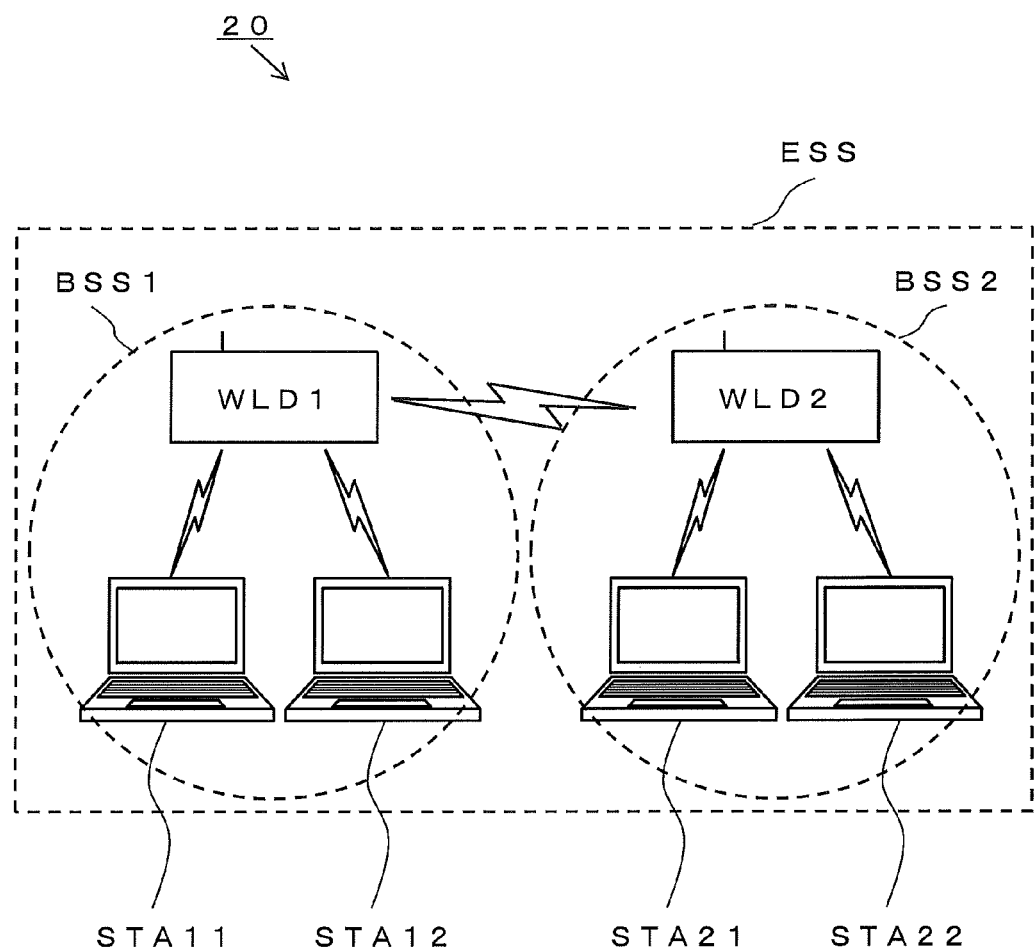
FIG. 1 is a schematic diagram illustrating a wireless LAN system according to an embodiment of the present invention.

FIG. 1 is a diagram illustrating a schematic configuration of a wireless LAN system 20 according to Embodiment 1 of the present invention. With reference to FIG. 1, wireless LAN system 20 includes two wireless LAN devices WLD1 and WLD2, and four stations STA11, STA12, STA21, and STA22. In this embodiment, the wireless LAN devices WLD1 and WLD2 and the stations STA11, STA12, STA21, and STA22 are wireless LAN devices compliant with the IEEE 802.11 standard. These wireless LAN devices are assigned the same ESSID (Extended Service Set Identifier), and are subjected to the same communication encryption.

In the present embodiment, the wireless LAN devices WLD1 and WLD2 have the same configuration, and have functions compliant with WDS (Wireless Distribution System) standards for wirelessly relaying packets from one wireless LAN device to another wireless LAN device. The wireless LAN devices WLD1 and WLD2 are installed in a coverage area where they are wirelessly connectable to each other. The wireless LAN devices WLD1 and WLD2 are allowed to communicate with each other by performing authentication or the like after a wireless LAN device detecting process described later. The wireless LAN devices WLD1 and WLD2 are allowed to use N channels (N: an integer not less than 2; N=14 in the present embodiment). In the present embodiment, two wireless LAN devices are provided, for example. However, three or more wireless LAN devices may be provided.

Each of the stations STA11, STA12, STA21, and STA22 is, for example, a general-purpose personal computer equipped with a wireless LAN card or a wireless LAN module embedded therein. The stations STA11 and STA12 are wirelessly connected to the wireless LAN device WLD1, and can communicate with each other in an infrastructure mode via the wireless LAN device WLD1. That is, the stations STA11 and STA12 and the wireless LAN device WLD1 constitute a BSS (Basic Service Set) network BSS1. Likewise, the stations STA21 and STA22 are wirelessly connected to the wireless LAN device WLD2, and can communicate with each other in an infrastructure mode via the wireless LAN device WLD2. That is, the stations STA21 and STA22 and the wireless LAN device WLD2 constitute a BSS network BSS2. The BBS networks BSS1 and BSS2 constitute an ESS (Extended Service Set) network, and thereby the stations STA11, STA12, STA21, and STA22 can communicate with each other via the wireless LAN devices WLD1 and WLD2. In the present embodiment, for example, two stations are provided in each BSS network. However, the number of the stations is not limited thereto. For example, one station or three or more stations may be provided in a BSS network.

Figure 2:
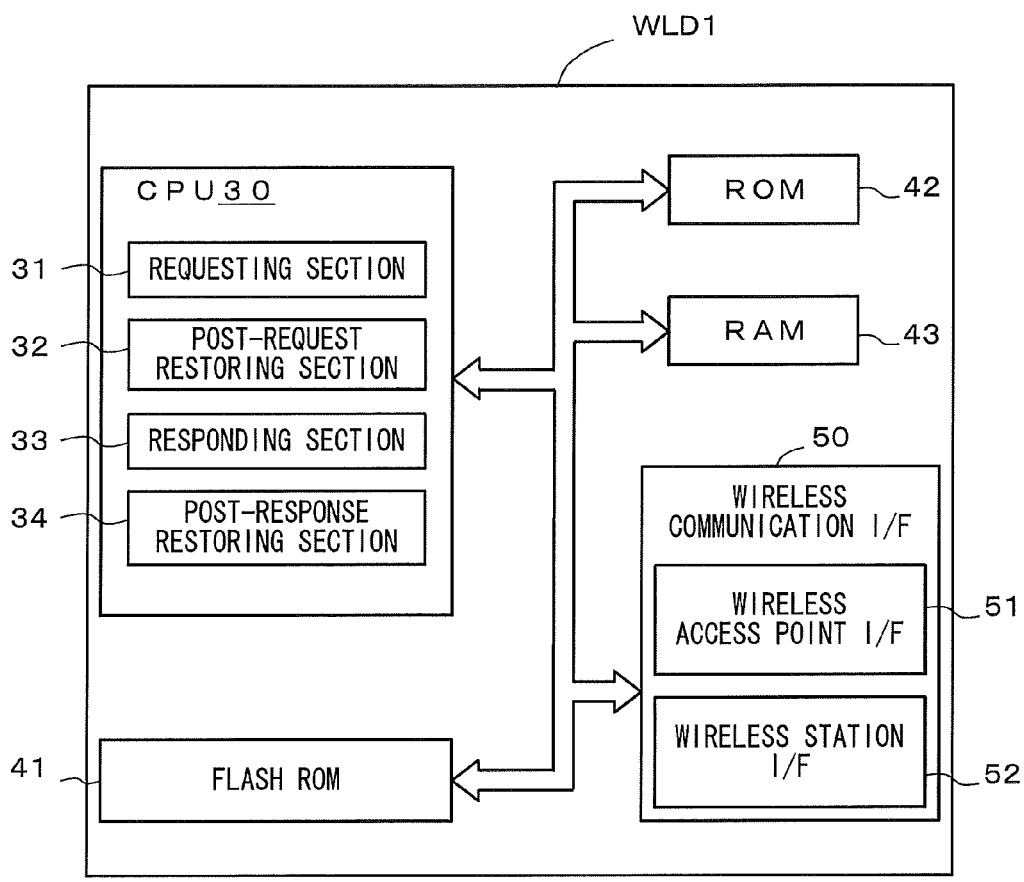
FIG. 2 is a schematic diagram illustrating a wireless LAN device WLD1.

FIG. 2 illustrates an exemplary schematic configuration of the wireless LAN device WLD1. As shown in FIG. 2, the wireless LAN device WLD1 includes a CPU 30, a flash ROM 41, a ROM 42, a RAM 43, and a wireless communication interface 50. These elements are interconnected via a bus.

The CPU 30 copies into the RAM 43 a program such as firmware stored in a non-transitory medium such as the flash ROM 41 or the ROM42, and executes the program. Thus, the CPU 30 controls the overall operation of the wireless LAN device WLD1. In accordance with the predetermined program, the CPU 30 functions as a requesting section 31, a post-request restoring section 32, a responding section 33, and a post-response restoring section 34. These functional sections will be described in detail later. In the present embodiment, the configuration of the wireless LAN device WLD2 is identical to that of the wireless LAN device WLD1. Hereinafter, the same components are referred to by the same reference numerals. Hereinafter, unless otherwise indicated, description of components is in reference to the components of the wireless LAN device WLD1.

The wireless communication interface 50 of the wireless LAN device WLD1 is an interface for performing wireless communication, and includes a wireless access point interface 51 and a wireless station interface 52. The wireless access point interface 51 functions as an access point, and wirelessly transmits/receives a packet to/from another station. The wireless station interface 52 functions as a station, and wirelessly transmits/receives a packet to/from another access point. In particular, the wireless access point interface 51 receives a packet that is referred to as a probe request, and transmits a packet that is referred to as a probe response. The wireless station interface 52 transmits a probe request, and receives a probe response. The wireless access point interface 51 and the wireless station interface 52 are provided in the wireless LAN device WLD1 in such a manner that they are allowed to transmit/receive radio waves to/from the outside. The respective functional sections of the CPU 30 communicate with another access point or station via the interfaces. It should be noted that the wireless access point interface 51 and the wireless station interface 52 may be physically configured as a single wireless module, or alternatively, as different modules.

Hereinafter, a wireless LAN device detecting process will be described. The wireless LAN device detecting process according to the present embodiment is a series of processes including: a probe request transmitting process in which a wireless LAN device transmits a probe request; a probe request receiving process in which another wireless LAN device which has received the probe request transmits a probe response in response to the probe request; and a probe response receiving process in which the wireless LAN device which has received the probe response detects the other wireless LAN device which has transmitted the probe response. In the present embodiment, the wireless LAN device WLD1 performs the probe request transmitting process and the probe response receiving process, and the wireless LAN device WLD2 performs the probe request receiving process.

Figure 3:
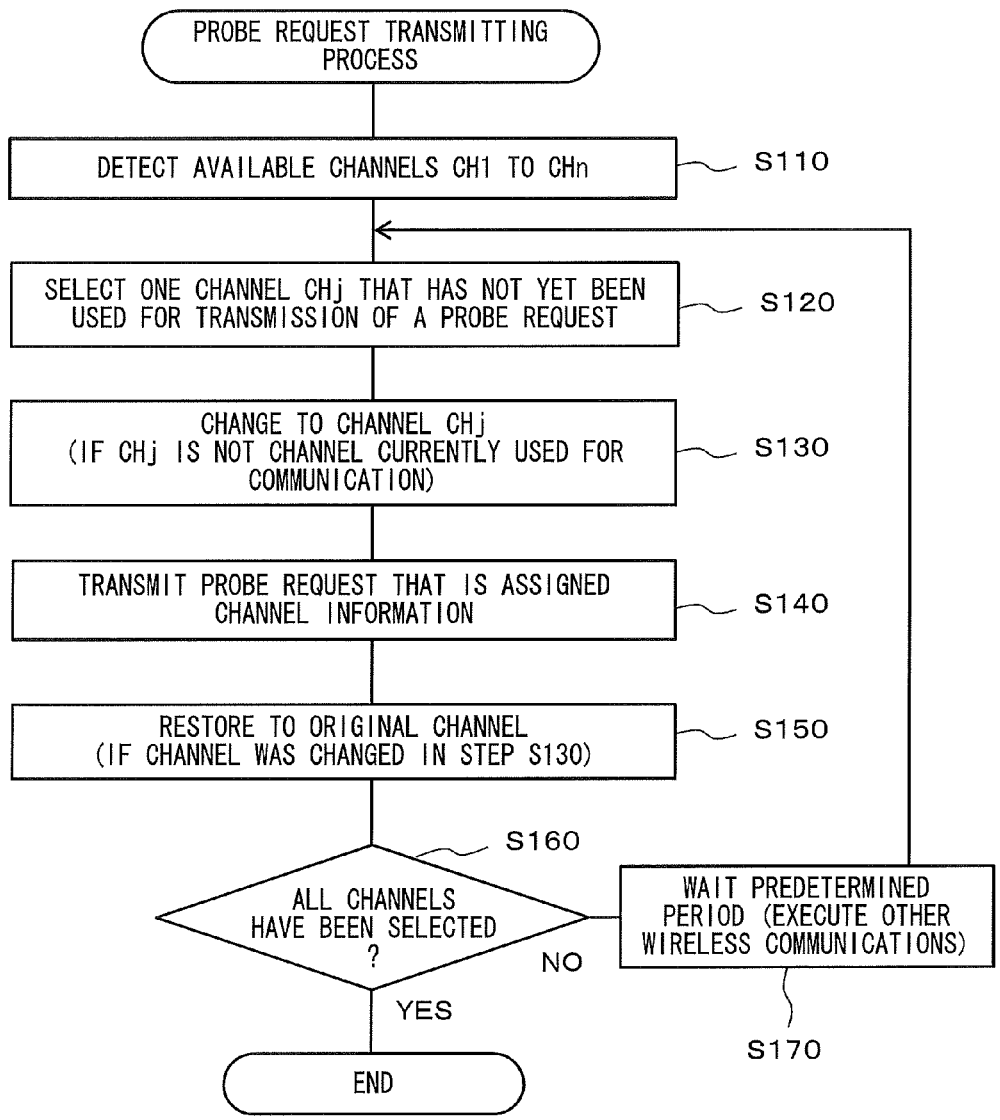
FIG. 3 is a flowchart illustrating a probe request transmitting process.

First, the probe request transmitting process performed by the wireless LAN device WLD1 will be described. FIG. 3 shows the flow of the probe request transmitting process. The wireless LAN device WLD1 performs the probe request transmitting process while being wirelessly connected to the stations STA11 and STA12. In the present embodiment, the wireless LAN device WLD1 communicates with the stations STA11 and STA12 using a channel CH1, for example. When the probe request transmitting process is started, as shown in FIG. 3, the CPU 30 of the wireless LAN device WLD1 detects channels CH1 to CHn that the wireless LAN device WLD1 can use (step S110). In the present embodiment, this process is performed by, for example, reading support information which indicates the available channels. The support information is stored in the ROM 42. It should be noted that the numbers 1 to n assigned to the channels are expediential numbers for distinguishing among the N channels.

When the CPU 30 detects the channels CH1 to CHn, the CPU 30 selects an arbitrary channel CHj (j: an integer not less than 1 but not greater than N) from among the channels that have not been used for transmission of a probe request (step S120). If the selected channel CHj is different from the channel that is currently used for communication with the stations STA11 and STA12, for example, the channel CH1 in the present embodiment, the CPU 30 changes the currently used channel from the channel CH1 to the channel CHj (step S130). If the channel CHj matches the currently used channel CH1, the CPU 30 does not perform channel change.

Next, the CPU 30, as a process of the requesting section 31, forms a probe request which is assigned channel information, and transmits the probe request by broadcasting using the channel CHj (step S140). The channel information indicates the channel that is used for communication with the stations STA11 and STA12, for example, the channel CH1 in the present embodiment. The frame configuration of the probe request is defined based on the IEEE 802.11 standard, and the frame elements constituting the probe request frame include an optional field that the vendor can optionally define. In the present embodiment, for example, the CPU 30 writes the channel information in the optional field of the probe request frame in the RAM 43 to form the probe request having the assigned channel information. In the present embodiment, however, if channel change was not performed in step S130, the CPU 30 forms a probe request that is not assigned the channel information, and transmits the probe request having no assigned channel information, in step S140. However, even in this case, the CPU 30 may form a probe request that is assigned the channel information.

After the transmission of the probe request, if channel change was performed in step S130, the CPU 30, as a process of the post-request restoring section 32, restores the currently used channel to the original channel that had been used before the channel change (step S150), for example, the channel CH1 in the present embodiment. The series of processes including the channel change, the transmission of the probe request, and the restoration of the currently used channel to the original channel are performed within a predetermined period T1. The shorter the period T1, the better. Specifically, the period T1 is desired to be equal to or shorter than a beacon transmission period T during which the wireless LAN device WLD1 transmits a beacon in order to maintain and manage the network BSS1 including the stations STA11 and STA12. Then, the CPU 30 can restore the currently used channel to the original channel, before the time when the next beacon transmission comes, thereby avoiding absence of the beacon transmission. As a result, communication connection to the stations STA11 and STA12 is less likely to be lost. If channel change was not performed in step S130, nothing is performed in step S150.

Next, the CPU 30 determines whether all the channels CH1 to CHn have been selected in step S120 (step S160). If there is an unselected channel (NO in step S160), the CPU 30 waits a predetermined period T3 (step S170). During the predetermined period T3 in step S170, other wireless communications using the original channel, such as transmission of a beacon and communication with the stations STA11 and STA12, are executed. After the predetermined period T3 has passed, the CPU 30 returns the process to step S120, and repeats the processes in steps S120 to S160.

The predetermined period T3 in step S170 is desired to be one or more times as long as the beacon transmission period T of the wireless LAN device WLD1. More desirably, the predetermined period T3 is two or more times as long as the beacon transmission period T. When the predetermined period T3 is one or more times as long as the beacon transmission period T, the beacon can be transmitted at least once during the predetermined period T3 in step S170, and thus communication connection to the stations STA11 and STA12 is less likely to be lost. The beacon sometimes disappears in the channel due to noise or the like, in which case the beacon fails to be normally received by the stations STA11 and STA12. However, by setting the predetermined period T3 two or more times (three times, for example) as long as the beacon transmission period T, the beacon can be transmitted twice or more during the predetermined period T3. Thus, the probability of disappearance of all the beacons during the predetermined period T3 is lowered, and communication connection to the stations STA11 and STA12 is more reliably prevented from being lost.

Figure 5:
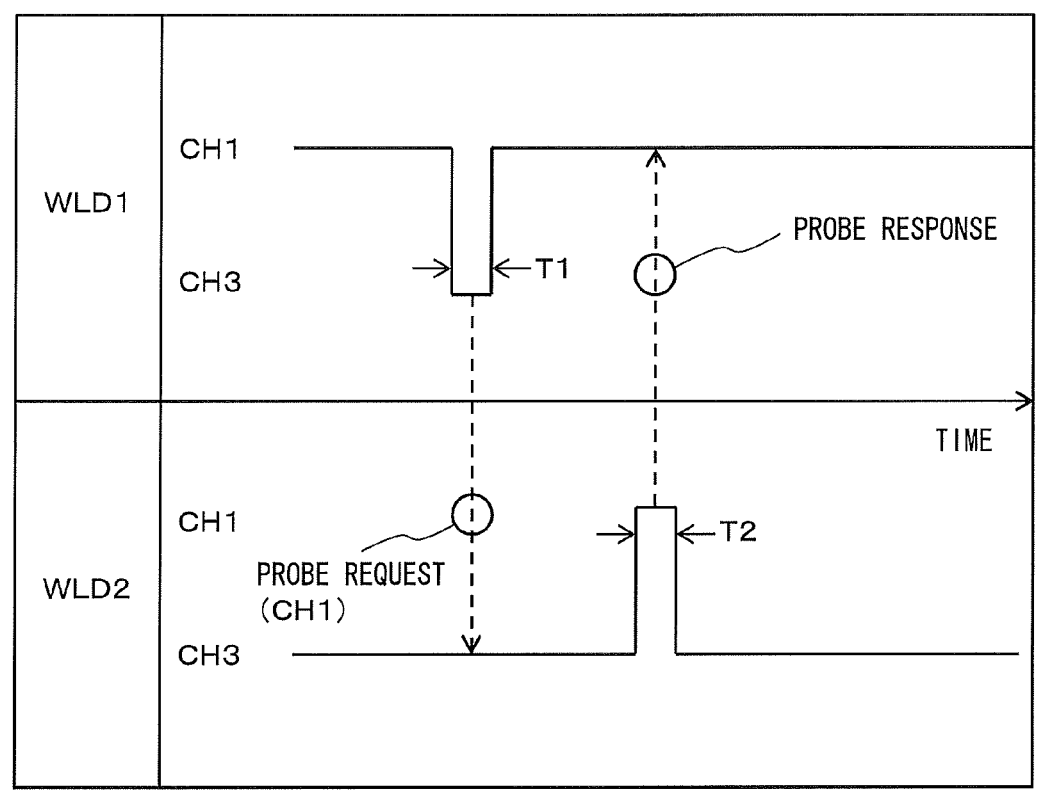
FIG. 5 is a diagram illustrating changing of channels used by wireless LAN devices WLD1 and WLD2.

After a probe request has been transmitted to all the channels CH1 to CHn (YES in step S160), the probe request transmitting process is ended. FIG. 5 shows how the wireless LAN device WLD1 changes the channel, and transmits a probe request. As seen from the above description, the wireless LAN device WLD1 changes, in a short period of time, the currently used channel, for example, the channel CH1, to another channel, such as the channel CH3, and transmits the probe request that is assigned the channel information indicating the channel that is currently used for communications with the stations STA11 and STA12. Thereby, the wireless LAN device WLD1 can let other wireless LAN devices know which channel the wireless LAN device WLD1 currently uses for communications with the stations STA11 and STA12, which in the present embodiment is the channel CH1.

Figure 4:
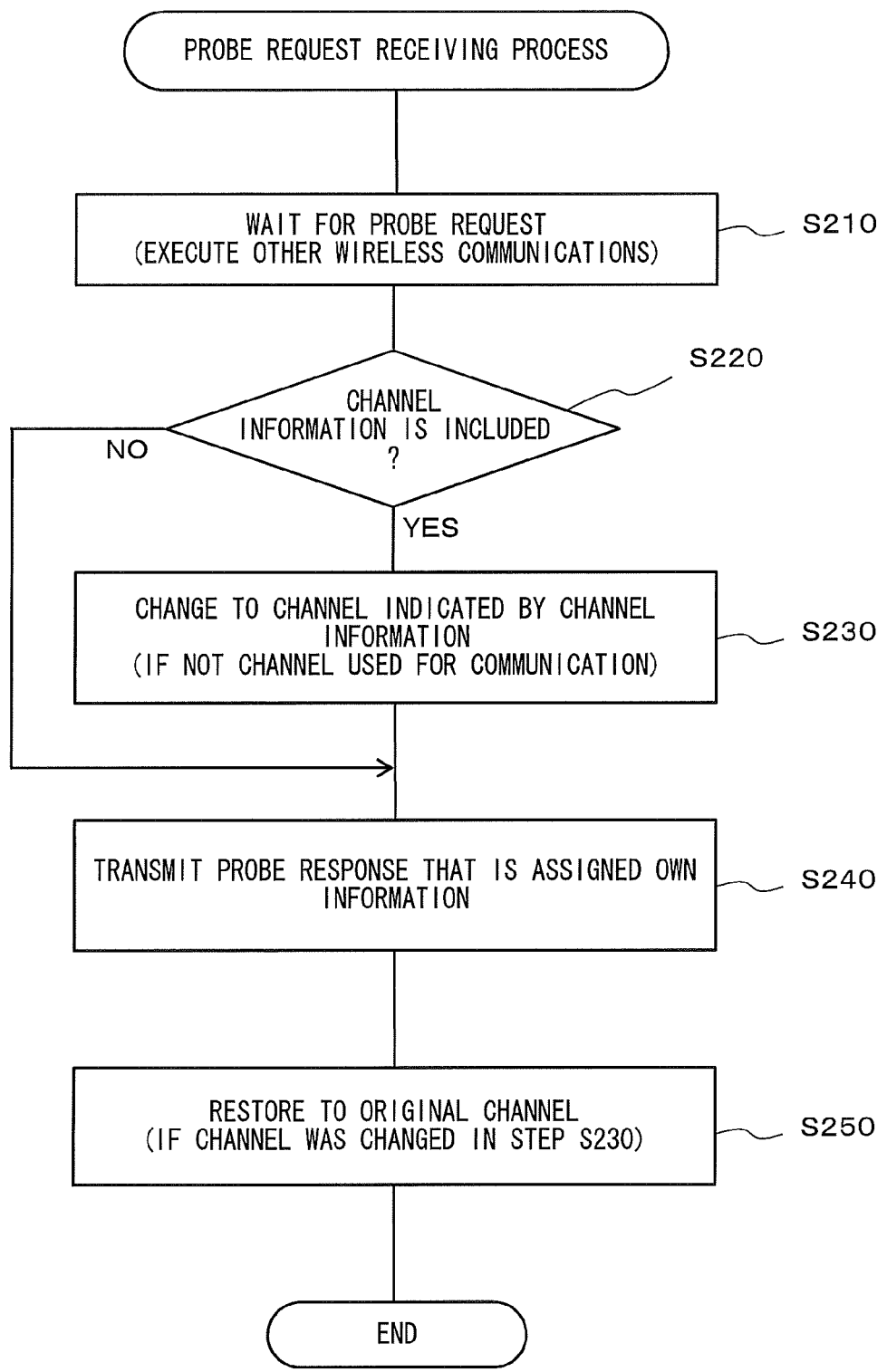
FIG. 4 is a flowchart illustrating a probe request receiving process.

Next, the probe request receiving process will be described. In the present embodiment, the wireless LAN device WLD2 performs the probe request receiving process. FIG. 4 shows the flow of the probe request receiving process. When the probe request receiving process is started, the CPU 30 of the wireless LAN device WLD2 waits for a probe request (step S210). During this period, other communication processes, such as communication with the stations STA21 and STA22, are continued.

When the wireless LAN device WLD2 receives a probe request, the CPU 30 thereof determines whether channel information is included in the optional field which is one of the frame elements constituting the probe request (step S220). When channel information is included in the optional field (YES in step S220), it means that the wireless LAN device WLD1, which has transmitted the probe request, is currently performing communication using the channel that is indicated by the channel information (the channel CH1 in this embodiment). Then, the CPU 30 of the wireless LAN device WLD2, as a process of the responding section 33, temporarily changes the channel that the wireless LAN device WLD2 currently uses (the channel CH3, for example), to the channel indicated by the channel information, that is, the channel CH1 in the present embodiment (step S230). In the case where the wireless LAN device WLD1 did not perform channel change in step S130 but formed and transmitted a probe request that is assigned the channel information in step S140, the channel indicated by the channel information might be identical to the channel that the wireless LAN device WLD1 used to transmit the probe request, that is, the channel that the wireless LAN device WLD2 used to receive the probe request. In this case, the wireless LAN device WLD2 does not perform channel change in step S230.

After the channel change to the channel CH1, the CPU 30 of the wireless LAN device WLD2, as a process of the responding section 33, forms a probe response including its own assigned information (such as SSID and channel information), and transmits the probe response to the wireless LAN device WLD1 (step S240). Since, in the IEEE802.11 standard, the channel information is defined as one of information elements of the probe response, the CPU 30 of the wireless LAN device WLD2 can readily assign the channel information to the probe response. On the other hand, when no channel information is included in the optional field in the received probe request (NO in step S220), it means that the wireless LAN device WLD1 did not perform channel change but used the channel CH1 for transmission of the probe request in step S130 of the probe request transmitting process, and that the wireless LAN device WLD2 received the probe request using the channel CH1. Therefore, the CPU 30 of the wireless LAN device WLD2 does not perform channel change (i.e., the CPU 30 skips step S230), and transmits the probe response to the wireless LAN device WLD1 by using the channel CH1 (step S240).

When transmission of the probe response is ended, if the CPU 30 did channel change in step S230, the CPU 30 of the wireless LAN device WLD2, as a process of the post-response restoring section 34, restores the currently used channel to the original channel used before the channel change (step S250) to end the probe request receiving process. The series of processes including the channel change, the transmission of the probe response, and the restoration of the currently used channel to the original channel are performed within a predetermined period T2. As in step S150, the shorter the period T2, the better. Thereby, the wireless LAN device WLD2 can continue communication with the stations STA21 and STA22 using the original channel. As seen from the above description, the wireless LAN device WLD2 changes, in a short period of time, the currently used channel, for example, the channel CH3, to the channel currently used by the wireless LAN device WLD1, for example, the channel CH1 in the present embodiment, and transmits the probe response. FIG. 5 shows how the wireless LAN device WLD2, which has received the probe request from the wireless LAN device WLD1, changes the channel, and transmits the probe response. It is seen from FIG. 5 that the wireless LAN device WLD1 changes the channel CH1 to the channel CH3 for a short period of time (T1) to transmit the probe request, and the wireless LAN device WLD2 changes the channel CH3 to the channel CH1 for a short period of time (T2) to transmit the probe response. If channel change was not performed in step S230, the wireless LAN device WLD2 transmits the probe response without changing the channel CH1 that is currently used by both the wireless LAN devices WLD1 and WLD2. In each case, the wireless LAN device WLD1 can receive the probe response using the currently used channel CH1.

Next, the probe response receiving process will be described. After the probe request transmitting process, the wireless LAN device WLD1 waits for a probe response from another wireless LAN device (for example, the wireless LAN device WLD2 in the present embodiment). FIG. 6 shows the flow of the probe response receiving process. The wireless LAN device WLD1 waits for a probe response while performing other wireless communications, such as transmission of a beacon and communication with the stations STA11 and STA12, by using the original channel CH1 (step S310). On receipt of a probe response, the CPU 30 extracts information (SSID, channel information, and the like) of the wireless LAN device WLD2 from the probe response frame, and writes the information in the RAM 43 and the like (step S320). Thus, the probe response receiving process is ended, and the wireless LAN device detecting process is completed. The channel information thus recorded allows a wireless LAN device that has detected another wireless LAN device by the wireless LAN device detecting process, to specify a channel that can be used for communication with the detected wireless LAN device, without the necessity of setting information of available channels of other wireless LAN devices constituting the wireless LAN system 20.

As described above, in the wireless LAN system 20, the wireless LAN device WLD1 can detect the wireless LAN device WLD2 which uses a channel different from a channel used by the wireless LAN device WLD1, while maintaining connection to the stations STA11 and STA12.

In addition, in the wireless LAN system 20, if the wireless LAN device WLD2 uses a channel that the wireless LAN device WLD1 can use, the wireless LAN device WLD1 can reliably detect the wireless LAN device WLD2. In addition, the wireless LAN device WLD1 can ensure transmission of a beacon through the currently used channel to prevent communication connection to the stations STA11 and STA12 from being lost.

In addition, in the wireless LAN system 20, the wireless LAN device WLD2 can transmit a probe response to the wireless LAN device WLD1 by using a different channel, while maintaining connection to the stations STA21 and STA22.

The wireless LAN devices WLD1 and WLD2 have the same configuration, and the roles thereof may be reversed. Specifically, the wireless LAN device WLD2 may perform the probe request transmitting process and the probe response receiving process, and the wireless LAN device WLD1 may perform the probe request receiving process. Alternatively, the roles of the wireless LAN devices WLD1 and WLD2 are not necessarily fixed. That is, when one of the wireless LAN devices WLD1 and WLD2 executes the probe request transmitting process, the other may execute the probe request receiving process with a probe request as a trigger. Then, the wireless LAN device that executed the probe request transmitting process may execute the probe response receiving process with a probe response as a trigger. Still alternatively, the wireless LAN device WLD1 (WLD2) may wait for both a probe request and a probe response regardless of whether it executes the probe request transmitting process. Depending on which of a probe request or a probe response the wireless LAN device WLD1 (WLD2) receives, the wireless LAN device WLD1 (WLD2) may execute either of the probe request receiving process or the probe response receiving response.

Hereinafter, modifications of the above-described embodiment will be described.

(Modification 1)

In the above-described embodiment of the present invention, the wireless LAN devices WLD1 and WLD2 constituting the wireless LAN system 20 have the same configuration. However, the wireless LAN devices WLD1 and WLD2 do not necessarily have the same configuration. In the wireless LAN device detecting process, if the roles of the wireless LAN devices WLD1 and WLD2 are fixed such that the wireless LAN device WLD1 performs the probe request transmitting process and the probe response receiving process and the wireless LAN device WLD2 performs the probe request receiving process, the CPU 30 of the wireless LAN device WLD1 need not have the functions of the responding section 33 and the post-response restoring section 34, and the CPU 30 of the wireless LAN device WLD2 need not have the functions of the requesting section 31 and the post-request restoration section 32. In addition, for example, the wireless LAN device WLD2 need not have the function as a station. The wireless LAN device WLD2 may have a wired interface and a bridge function.

(Modification 2)

In the above-described embodiment of the present invention, for example, the wireless LAN device WLD1 is wirelessly connected to the stations STA11 and STA12, and transmits a probe request during communication with the stations STA11 and STA12. However, for example, the wireless LAN device WLD1 may be wirelessly connected, not to the stations STA11 and STA12, but to a third wireless LAN device WLD3 having the function of inter-wireless-LAN-device communication compliant with the WDS standards, and may transmit a probe request during communication with the wireless LAN device WLD3. Specifically, the wireless LAN device WLD1 may act as a station and transmit a probe request to detect the wireless LAN device WLD2, while performing communication compliant with the WDS standards with the wireless LAN device WLD3. Alternatively, the wireless LAN device WLD1 may detect, not the wireless LAN device WLD2, but a repeater having the function to perform the probe request receiving process. Still alternatively, either of these wireless LAN devices may have the function of a switching hub, and may be connected to a WAN (Wide Area Network).

(Modification 3)

In the above-described embodiment of the present invention, the wireless LAN device WLD1 transmits a probe request by successively using all the channels CH1 to CHn that the wireless LAN device WLD1 can use. However, if the channels that the wireless LAN device WLD2 can use are previously known, the wireless LAN device WLD1 may select, in step S120, a channel from among the channels that the wireless LAN device WLD2 can use. Thus, the efficiency of the wireless LAN device detecting process is improved.

(Modification 4)

In the above-described embodiment of the present invention, the wireless LAN device WLD1 performs, every time a probe request is transmitted, restoration to the original channel and securement of a waiting time (predetermined period T3) in the channel. However, as long as communication connection to the stations STA11 and STA12 can be maintained, chances of restoration to the original channel and securement of the waiting time in the channel may be reduced or eliminated. As long as it is apparent that communication connection to the stations STA11 and STA12 would not be lost, for example, when the wireless LAN device WLD1 can transmit the probe request by using a plurality of channels during the beacon transmission period T, the wireless LAN device WLD1 may perform restoration to the original channel and securement of the waiting time in the channel every time two probe requests are transmitted by using different channels. Alternatively, the wireless LAN device WLD1 may not perform such restoration to the original channel and securement of the waiting time.

The embodiment of the present invention has been described as above. Among the components according to the above-described embodiment of the present invention, the components other than those described in independent claims are supplementary components, and thus some of these may be eliminated or integrated as appropriate. Further, the present invention is not limited to the embodiment. It is understood that the present invention should be embodied in various ways without departing from the principal of the invention. For example, the present invention can be realized not only as a wireless LAN system but also as a wireless LAN device, a program for the wireless LAN device, a storage medium having stored therein the program, and a method for detecting a wireless LAN device. The storage medium may be non-transitory, such as any computer-readable storage medium, or transitory, such as a propagation signal.

While the invention has been described in detail, the foregoing description is in all aspects illustrative and not restrictive. It will be understood that numerous other modifications and variations can be devised without departing from the scope of the invention.

What is claimed is:

1. A wireless LAN system including a first wireless LAN relay device and a second wireless LAN relay device that are able to wirelessly communicate with each other by using a plurality of channels, and a station that is able to wirelessly communicate with the first wireless LAN relay device, wherein the first wireless LAN relay device comprises:
a requesting section for transmitting a first probe request by using a second channel selected from among a plurality of channels that the first wireless LAN relay device can use, the first probe request being assigned channel information indicating a first channel that the first wireless LAN relay device currently uses for communication with the station; and
a post-request restoring section for restoring the channel to be used by the first wireless LAN relay device from the second channel to the first channel within a first predetermined period from start of use of the second channel, after the transmission of the first probe request, when the second channel is not identical to the first channel; and the second wireless LAN relay device comprises:
a responding section for receiving the first probe request by using the second channel, specifying the first channel based on the channel information assigned to the first probe request, and transmitting a probe response to the first wireless LAN relay device by using the first channel; and
a post-response restoring section for restoring the channel to be used by the second wireless LAN relay device from the first channel to the second channel within a second predetermined period from start of use of the first channel, after the transmission of the probe response, when the second channel is not identical to the first channel, wherein the requesting section successively selects an additional channel, each time the requesting section transmits another probe request after the first probe request, until all the channels that the first wireless LAN relay device can use have been selected, and wherein the first wireless LAN relay device further comprises a waiting control section for controlling the first wireless LAN relay device so as to restore the channel from the second channel to the first channel using the post-request restoring section, each time the requesting section transmits the another probe request after the first probe request, and wait at the first channel for more than a beacon transmission period during which the first wireless LAN relay device transmits a beacon to the station, before transmitting the another probe request.

2. The wireless LAN system according to claim 1, wherein each of the first and second predetermined periods is equal to or shorter than the beacon transmission period.

3. A wireless LAN relay device, which is able to wirelessly communicate with another wireless LAN relay device by using a plurality of channels, the wireless LAN relay device comprising:
a requesting section for transmitting a first probe request by using a second channel selected from among a plurality of channels that the wireless LAN relay device can use, the first probe request being assigned channel information indicating a first channel that the wireless LAN relay device currently uses for communication with a station; and a post-request restoring section for restoring the channel to be used by the wireless LAN relay device from the second channel to the first channel within a first predetermined period from start of use of the second channel, after the transmission of the first probe request, when the second channel is not identical to the first channel, wherein the requesting section successively selects an additional channel, each time the requesting section transmits another probe request, until all the channels that the wireless LAN relay device can use have been selected, and wherein the wireless LAN relay device further comprises a waiting control section for controlling the wireless LAN relay device so as to restore the channel from the second channel to the first channel using the post-request restoring section, each time the requesting section transmits the another probe request after the first probe request, and wait at the first channel for more than a beacon transmission period during which the wireless LAN relay device transmits a beacon to the station, before transmitting the another probe request.

4. A method for, in a wireless LAN system including a first wireless LAN relay device and a second wireless LAN relay device that wirelessly communicate with each other by using a plurality of channels, and a station that is able to wirelessly communicate with the first wireless LAN relay device, causing the first wireless LAN relay device to detect the second wireless LAN relay device, the method being executed by a first processor of the first wireless LAN relay device and a second processor of the second wireless LAN relay device, the method comprising:

transmitting, by the first processor, a first probe request by using a second channel selected from among a plurality of channels that the first wireless LAN relay device can use, the first probe request being assigned channel information indicating a first channel that the first wireless LAN relay device currently uses for communication with the station;

when the second channel is not identical to the first channel, restoring, by the first processor, the channel to be used by the first wireless LAN relay device from the second channel to the first channel within a first predetermined period from start of use of the second channel, after the transmission of the first probe request;

receiving, by the second processor, the first probe request by using the second channel, specifying the first channel based on the channel information assigned to the first probe request, and transmitting a probe response to the first wireless LAN relay device by using the first channel;

when the second channel is not identical to the first channel, restoring, by the second processor, the channel to be used by the second wireless LAN relay device from the first channel to the second channel within a second predetermined period from start of use of the first channel, after the transmission of the probe response; and receiving, by the first processor, the probe response by using the first channel, thereby detecting the second wireless LAN relay device, wherein, in transmitting the first probe request, the first processor successively selects an additional channel, each time the first processor transmits another probe request after the first probe request, until all the channels that the first wireless LAN relay device can use have been selected, and wherein the first processor restores the channel from the second channel to the first channel, each time the first processor transmits the another probe request, and wait at the first channel for more than a beacon transmission period during which the first wireless LAN relay device transmits a beacon to the station, before transmitting the another probe request.

5. A detecting method for causing a processor of a wireless LAN relay device, which is able to wirelessly communicate with another wireless LAN relay device by using a plurality of channels, to detect the other wireless LAN relay device, the method comprising:

transmitting a first probe request by using a second channel selected from among a plurality of channels that the wireless LAN relay device can use, the first probe request being assigned channel information indicating a first channel that the wireless LAN relay device currently uses for communication with a station;

when the second channel is not identical to the first channel, restoring the channel to be used by the wireless LAN relay device from the second channel to the first channel within a first predetermined period from start of use of the second channel, after the transmission of the first probe request; and receiving, from the other wireless LAN relay device that received the first probe request, a probe response as a response to the first probe request, by using the first channel, thereby detecting the other wireless LAN relay device, wherein, in transmitting the first probe request, the processor successively selects an additional channel, each time the processor transmits another probe request after the first probe request, until all the channels that the wireless LAN relay device can use have been selected, and wherein the processor restores the channel from the second channel to the first channel, each time the processor transmits the another probe request, and wait at the first channel for more than a beacon transmission period during which the wireless LAN relay device transmits a beacon to the station, before transmitting the another probe request.

6. A nontransitory computer-readable information recording medium encoded with a program that causes a processor of a wireless LAN relay device that is able to wirelessly communicate with another wireless LAN relay device using a plurality of channels to execute a process comprising:

transmitting a first probe request by using a second channel selected from among a plurality of channels that the wireless LAN relay device can use, the first probe request being assigned channel information indicating a first channel that the wireless LAN relay device currently uses for communication with a station;

when the second channel is not identical to the first channel, restoring the channel to be used by the wireless LAN relay device from the second channel to the first channel within a first predetermined period from start of use of the second channel, after the transmission of the first probe request; and receiving, from the other wireless LAN relay device that received the first probe request, a probe response as a response to the first probe request, by using the first channel, thereby detecting the other wireless LAN relay device, wherein, in transmitting the probe request, the processor successively selects an additional channel, each time the processor transmits another probe request after the first probe request, until all the channels that the wireless LAN relay device can use have been selected, and wherein the processor restores the channel from the second channel to the first channel, each time the processor transmits the another probe request, and wait at the first channel for more than a beacon transmission period during which the wireless LAN relay device transmits a beacon to the station, before transmitting the another probe request.

* * * * *